Feb. 2, 1971 K. P. KRICK 3,560,988
HIGH SPEED PRECISION PLACEMENT OF LIQUID DROPS
Filed Oct. 18, 1968 2 Sheets-Sheet 1
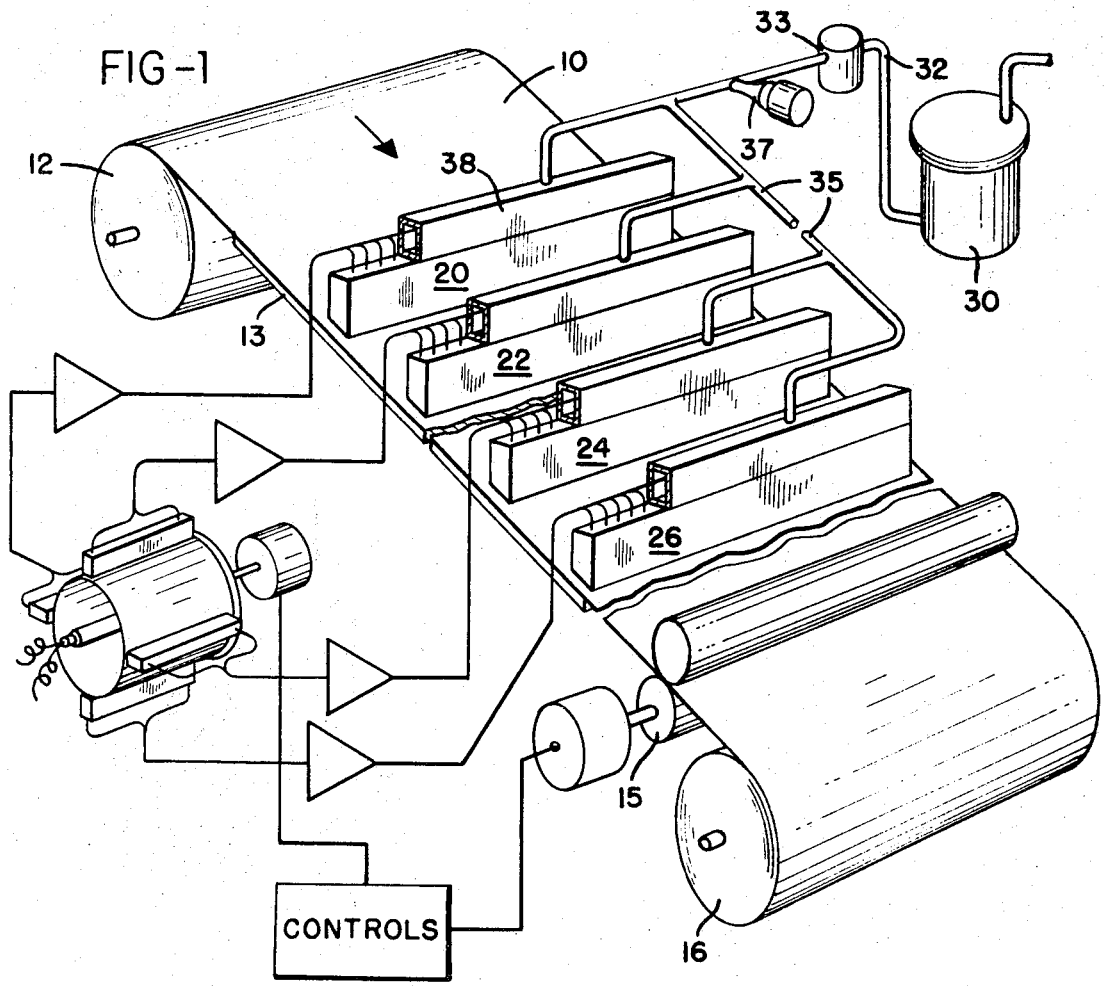
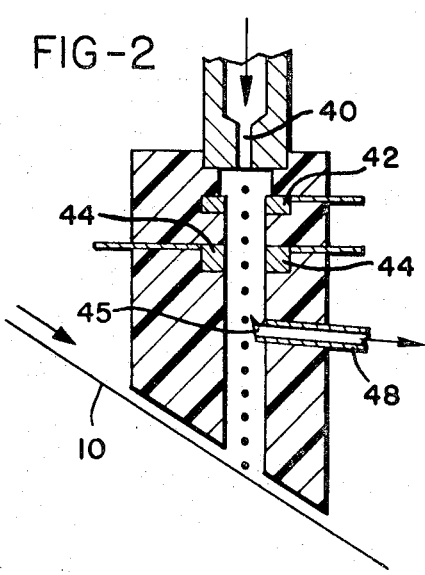
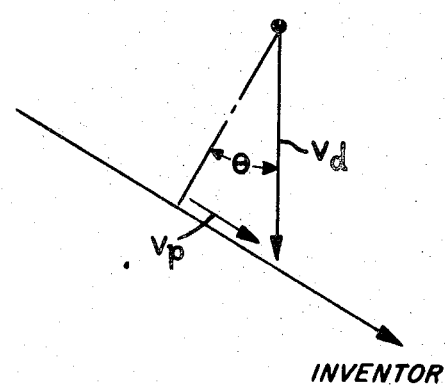
INVENTOR
KRAIG P. KRICK
BY
Marechal, Biebel, French & Bugg
ATTORNEYS

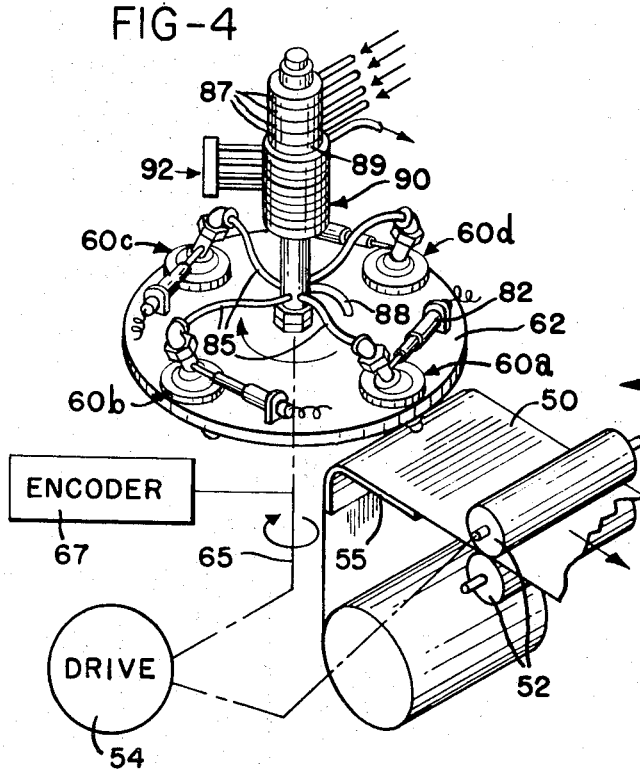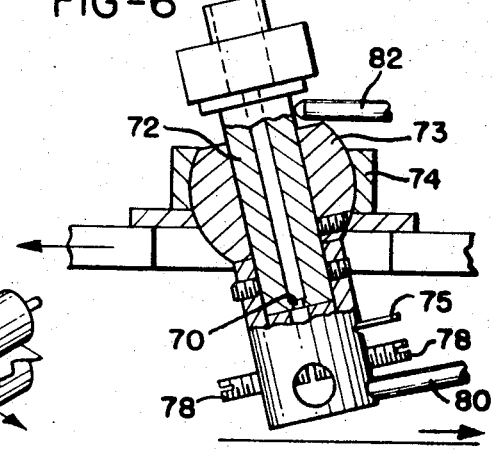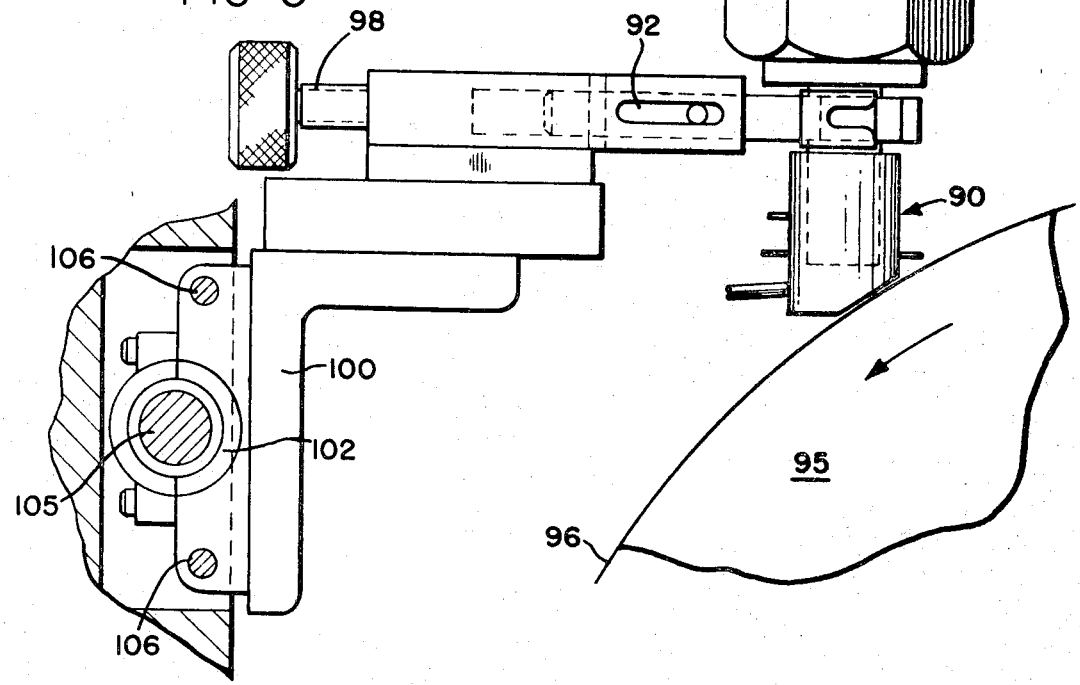

3,560,988
HIGH SPEED PRECISION PLACEMENT OF LIQUID DROPS
Kraig P. Krick, Grove City, Ohio, assignor to The Mead Corporation, Dayton, Ohio, a corporation of Ohio
Filed Oct. 18, 1968, Ser. No. 768,767
Int. Cl. G01d 15/18
U.S. Cl. 346—1                                      7 Claims

ABSTRACT OF THE DISCLOSURE

Individual drops are successively projected for deposit in predetermined spaced locations on a receiving member. The drops are projected along a path which intersects the receiving member at an angle arranged to impart a substantial velocity component to the drops in a direction parallel to the direction of relative movement between the drop generator and the receiving member; the drops thus deposit on the receiving surface in generally circular configuration. The relative movement can result from moving of the receiving member, or the drop projector, or both.

CROSS REFERENCES TO RELATED APPLICATIONS

This application is related to copending applications entitled Image Construction System Using Multiple Arrays of Drop Generators, Ser. No. 768,790, Image Construction System With Scanning Drop Generators, Ser. No. 768,800, and Image Construction System With Clocked Information Input, Ser. No. 768,763, all filed of even date herewith and assigned to the same assignee.

BACKGROUND OF THE INVENTION

The invention relates to deposit of controlled amounts of liquid in selected locations on a receiving member. Individual drops of liquid are generated in a stream or streams. Relative movement between the receiving member and the stream causes the drops to deposit at different selected locations, and the spacing of the drops is controlled by electrostatic charging and switching controls. The drops are projected at relatively high velocity toward the receiving member, and the relative movement between it and the stream is likewise at relatively high velocity. The liquid drops depositing under these circumstances have been observed to smear or distort upon impact with the receiving member, thus causing a distorted, non-circular mark. Particularly where precision is desired in the production of graphic images, as in printing, it is desirable to minimize this distortion.

SUMMARY OF THE INVENTION

Essentially circular, non-distorted, marks can be obtained in such systems by causing the individual drops being deposited to achieve a velocity component, parallel to the direction of relative movement between the drop source or generator and the receiving member, which is of such substantial magnitude that the drops deposit with little or no distortion. The form of the structure for accomplishing this depends upon the type of drop depositing system.

Thus if the receiving member is moved (1) in a planar path, or (2) in a curvilinear path, relative to a stationary drop generating device, then the drop stream is aimed to intersect the member at a predetermined acute angle in the direction of motion. If the drop generating device is moved to scan the receiving member, then the drop stream is aimed in a trailing direction, at a predetermined acute angle, toward the receiving member.

The primary object of the invention is, therefore, to achieve symmetrical, essentially circular, deposits on a receiving member from liquid drops which are projected toward the receiving member at high velocity, by aiming the drops at the surface at an angle sufficient to develop a substantial velocity component in the drops tending to minimize non-perpendicular relative movement between the drops and the receiving member as they impact such member.

Other objects and advantages of the invention will be apparent from the following description, the accompanying drawings and the appended claims.

BRIEF DESCRIPTION OF THE DRAWINGS

FIG. 1 is a schematic perspective view of a system involving several arrays of drop generators all angularly aimed at a moving web receiving member;

FIG. 2 is a detail section view taken through one array shown in FIG. 1;

FIG. 3 is a diagram illustrating the invention by velocity vectors as applying to FIG. 2;

FIG. 4 is a diagrammatic perspective view of another system in which drop generators are scanned over a receiving member which moves at much slower velocity;

FIG. 5 illustrates another embodiment in which one or more drop generators are angularly aimed at a receiving member guided in a curvilinear path over a rotating cylinder; and FIG. 6 is a detail view of the mounting of one drop generator shown in FIG. 4.

DESCRIPTION OF PREFERRED EMBODIMENTS

Referring to the drawings, and particularly to FIGS. 1–3, which illustrate one preferred embodiment of the invention, for purposes of explanation the receiving member onto which the pattern or image is to be created, for example repetitively as in a printing operation, is shown as a web of paper 10 from a supply roll 12 passing over supporting structure such as a table 13 over a pinch roll 15 onto a take-up roll 16. Over the table 13 there are a plurality of arrays of units each of which includes a plurality of orifices through which the liquid is expelled in a stream which is broken into individual drops. For purposes of explanation the first array 20 is shown as uppermost, and the web 10 passes first beneath this array, then next to an array 22 of identical structure, and thence past additional arrays 24 and 26. The web and table are shown broken between the arrays 22 and 24, signifying that the number of arrays is variable, depending upon the desired result.

The liquid substance to be placed precisely on the web 10 is supplied from a reservoir or tank 30 through an output conduit 32 and through a filter 33 to a manifold arrangement 35 which, as shown, apportions and supplies each of the arrays with the liquid under pressure. A vibrator device, such as a supersonic vibrator, is indicated schematically at 37 and is attached to the liquid supply piping in order to impose a high frequency vibration on the entire liquid supply system.

The liquid from the supply piping is directed to a cross manifold in each of the arrays, for example to the manifold 38 of the array 20, and these manifolds in turn have a large number of small orifices 40 (FIG. 3) from which a fine liquid stream is expelled. As a result of the high frequency vibration, the stream rapidly breaks into individual drops which are accordingly spaced. In a typical embodiment the orifices 40 are each of a size in the order of 1.5 mils, and the resultant drops are of a size in the order of 3 mils diameter. Drops of this size typically produced circular dots on the web having a diameter of about 5 mils.

In a system of this type in order to achieve solid cover over an eight inch wide image area on the web, 2000 orifices are required spaced on centers about 4 mils apart. Space requirements are such that the orifices cannot readily be arranged in a continuous row transversely of the sheet, hence in order to accommodate the necessary spacing between orifices into their physical size and the size of the related control equipment, the orifices are instead spaced apart a substantially greater distance in each array, and these orifices preferably are evenly spaced, and the arrangement is the same in each array, with the individual arrays being offset such that the orifices "track" over separate adjacent bands or strips along the sheet and fill with respect to each other in such a manner that if all of the orifices are continuously operating and all drops are permitted to strike the surface of the web, the web will be fully covered across the eight inch image web.

In order to control the deposition or non-deposition of the drops, each drop which it is desired not to deposit is electrostatically charged by controlling a potential applied to the charge ring 42 (FIG. 2) spaced in the control structure immediately below the orifice 40. Downstream of the charging electrode is a set of deflecting electrodes 44 which provides a continuous deflecting field operating to deflect charged drops from the stream into a catcher unit 45 which includes a blade or tip 46 projecting outward adjacent, but not intercepting the stream path of the uncharged, and hence not deflected, drops. The drops that are deflected into the catcher accumulate and are recirculated to the reservoir through a return line 48, a segment of which is shown in FIG. 2.

The charge applying electrode 42 thus functions as a means for selectively charging drops which are not to be deposited on the web, and together with the deflecting electrodes 44 and the catcher 45, these parts function as a means for moving from the drop stream those drops which are not to deposit on the web or other receiving element. The system is thus binary, in that absence of a charge results in a drop passing directly to and depositing on the web, whereas presence of a charge results in deflection instead of deposition.

As shown in FIG. 3 it is preferred that the web and the stream of drops, moving at a velocity $V_d$, intersect at an angle. The angle $\theta$, representing the directional deviation of the stream from a normal to the web, and downstream in the direction of relative movement between the stream and the web, is so selected that the drop facial velocity component $V_d \sin \theta$ approximately equals the velocity of the receiving medium $V_p$, or at least has a significant magnitude in relation thereto. It has been found that this arrangement results in minimum deformation of the drop as it deposits on the web, and hence formation of a dot which is essentially circular, or radially symmetrical, on the web.

The arrangement can be described by the equation $$\frac{V_d}{V_p} \sin \theta$$

being substantially greater than zero.

FIGS. 4 and 6 illustrate another embodiment of the invention, wherein the drop generators are scanned over the receiving member. In this case, the web 50 is driven through drive rollers 52 from the suitable drive means 54, in the direction indicated by the arrow in FIG. 4. The web is thus moved over the locating table or support surface 55, and this movement is at a substantially slower velocity than the movement of the web shown in FIG. 1. A plurality of drop generators 60a–60d are supported on a disc or plate 62 which is in turn carried on a rotatable shaft 65 driven from the drive means 54. This same drive means, as shown schematically, also drives a printer encoder 67 whch provides registering or control pulses for the system.

A detail of one of the drop generators is shown in FIG. 6, with the orifice 70 provided in a liquid ink supply tube 72 which is carried in an adjustable ball-type mounting 73. This mounting is in turn positioned within a correspondingly shaped socket 74 fastened to the disc 62.

The electrode charging and deflecting mechanism are of the same general type as shown in FIG. 2. The connection to the charging electrode is indicated at 75, and connections to the deflection electrodes are indicated at 78. The catcher unit 80 projects into the lower end of the unit, in close proximity to the path or trajectory of the drops issuing from the nozzle 70. The sonic transducer, which stimulates the drop generator to produce drops at the desired frequency, is indicated generally at 82, it being understood, as shown in FIG. 4, that there are preferably separate stimulators for each drop generator unit.

The liquid ink supply is conducted to the individual drop generators through flexible hoses 85 which extend through passages (not shown) inside the rotating shaft 65 into respective ones of the rotary connectors 87. similarly, each of the catcher units 80 is connected into a common return tube 88 which in turn extends through a passage in the shaft to the rotary joint 89 providing an exit for the liquid collected from the respective catcher units. The slip rings 90 and corresponding brushes 92 provide separate electrical connectors for the respective charging electrodes, power supply for the deflecting electrodes, and power supply for the sonic stimulators.

With reference to FIG. 6, it will be noted that each drop as it leaves its parent orifice has impressed upon it a total velocity which is the vector sum of the drop velocity relative to the orifice and the velocity of the orifice relative to inertial space. Further with reference to FIG. 6, it will be noted that the longitudinal axes of each of the drop generator units is inclined in a rearward direction with respect to the directon of rotational movement of disc 62. In this case, since the rotary scanning movement of the drop generators is at a considerably higher speed than the advancing movement of the web 50, the inclination of the drop generator is provided at an angle such that drop velocity relative to the orifice has a rearward component which effectively cancels or at least substantially reduces the velocity contribution produced by rotational movement of the orifice. Preferably the drop generators should also be inclined somewhat outwardly to provide the drops with a facial velocity component to match the movement of the web.

The encoder 67 provides a source of control pulses which serve to control the stimulating frequency of the stimulating device 82 at a frequency which corresponds to the scanning rate of each drop generator against the web 50. In other words, the frequency resulting from control by the encoder will produce drops spaced apart such that they are deposited in adjoining positions along an arcuate scan line on the web 50, and if drops are permitted to deposit successively, a solid generally arcuate line may be formed across the web. Forward motion of the web 50 is sufficient, and is correlated through the common drive means 54, to cause successive scans of the drop generators 60a–60d to fall along arcuate scan lines spaced apart by a selected distance. For example if it is desired that the dots formed by deposited drops should join, or slightly overlap, then the forward motion of the web 50 between the beginning of the succeeding scans will equal the desired center-to-center spacing of the dots. The encoder also provides gating signals whereby digital intelligence to the charging electrode 65 can be gated to assure precise placement of the liquid drops along the scan lines at predetermined coordinate positions on the web 50.

The successive control pulses from the encoder will provide gating signals spaced in time according to the center-to-center spacing desired for successive drops from the drop generators.

FIG. 5 illustrates a further embodiment of the invention, wherein the drop generator 90, having the same component arrangement as shown in FIG. 3, is adjustably supported on an arm 92, and positioned over the surface of a rotating cylinder 95 carrying a receiving member 96, such as a paper sheet, on its surface. The supporting arm 92 may include a threaded adjustable shaft 98 for precise positioning of the drop generator in close proxmity to the surface of the receiving member.

This structure is in turn mounted upon a slide 100 which is moved through connections between a nut 102 carried on the slide and a helically threaded cross shaft 105. The slide may be supported and guided on suitable rods 106 extending parallel to the threaded shaft 105.

The drive means 110 is connected to rotate cylinder 95 at a predetermined speed and to rotate the shaft 105 at a predetermined substantially slower speed. Rotation of the drum 95 is related to the frequency of drop generation, which again may be controlled by a suitable stimulator (not shown) of the same type previously illustrated and described in FIGS. 1 and 4. The correlation between movement of the receiving member 96 and drop generation rate is such that the dots formed on the receiving member by successive drops will preferably adjoin or overlap, although they may be in slightly spaced relation if so desired. The rotation of shaft 105 is such that movement of the drop generator longitudinally of the cylinder 95 will occur during one complete revolution of the cylinder through a distance equal to the desired center-to-center dot separation distance. In other words, the drop generator is caused to scan in a shallow helical path over the surface of the cylinder 95 and the receiving member 96 carried thereon.

In accordance with the invention the longitudinal center line of the drop generator intersects the arcuate path of the receiving member 96 at an angle such that the velocity component of the drops along this arcuate path approximately equals the velocity of the reeciving member. It will be appreciated that this angular intersection is achieved by aligning the longitudinal axis of the drop generator with a chord of the circular cross section of the cylinder 95, the particular chord being chosen to achieve the desired angular relationship.

In each of the embodiments above described, the direction of the drops as they approach the receiving surface is such that the velocity component resulting from projection of the drops, along the direction of relative movement between the drop generator and the receiving member, is approximately equal to the velocity of the relative movement between the drop generator and the receiving member. As noted, this minimizes the deformities of the resulting dot, which thus results as an essentially circular mark on the receiving member.

While the forms of apparatus herein described constitute preferred embodiments of the invention, it is to be understood that the invention is not limited to these precise forms of apparatus, and that changes may be made therein without departing from the scope of the invention.

What is claimed is:

1. The method of depositing liquid drops on a receiving surface comprises,
    (a) projecting a stream of equally spaced liquid drops along a predetermined path toward a receiving surface at a predetermined high velocity,
    (b) producing a relative movement between said projecting means and the receiving surface at constant velocity sufficient to cause deposit of successive individual drops in different equally spaced locations on the receiving surface, and
    (c) directing the drop path at an angle to the receiving surface of such magnitude that the drop velocity component parallel to the receiving surface and in the same direction as the relative movement is of the same order of magnitude as such constant relative velocity whereby the drops deposit on the receiving surface in generally circular configuration.

2. The method of depositing liquid drops on a receiving surface, compising,
    (a) projecting parallel streams of spaced liquid drops along predetermined parallel paths and at a common frequency toward a receiving surface at a predetermined high velocity,
    (b) producing movement of the receiving surface past all of said streams at a constant velocity sufficient to cause deposition of successive individual drops from each of said streams in different equally spaced locations on the receiving surface, and
    (c) directing all the drop paths at the same angle to the receiving surface sufficient to impart a velocity component to drops from each of the parallel streams in a direction along the receiving surface and of such magnitude that the drop velocity component parallel to the receiving surface is of the same order of magnitude as the constant relative velocity between the projecting means and the receiving surface whereby all of the drops deposit on the receiving surface in generally circular configuration.

3. Apparatus for depositing liquid drops on a receiving surface comprising:
    means for projecting a stream of equally spaced liquid drops along a predetermined path at a predetermined high velocity $V_d$,
    a receiving surface,
    means supporting said receiving surface intersecting said path,
    means producing relative spacing movement between said drop projecting means and said supporting means at a constant velocity $V_p$ sufficient to cause deposition of successive individual drops in different esually spaced locations on said receiving surface, and
    means mounting said drop projecting means at an angle $\theta$ of such magnitude that the drop facial velocity component $V_d \sin \theta$ for all drops is in the same direction and parallel to the spacing movement velocity $V_p$ and is approximately equal to the velocity $V_p$ whereby the drops deposit on said receiving surface with a minimum of relative movement therebetween to produce essentially circular drop deposits.

4. Apparatus as defined in claim 3, including switching means associated with said projecting means and operative to control the spacing of successive drops in the stream whereby the drops deposit in predetermined spaced locations on said receiving member.

5. Apparatus as defined in claim 4, wherein said means producing relative movement includes a stationary support for said projecting means and said supporting means is constructed and arranged to move said receiving member across said path at the predetermined angle.

6. Apparatus as defined in claim 4, wherein said means producing relative movement includes a guide incorporated in said supporting means defining a plane surface intercepting said path at the predetermined angle and means for moving said receiving member along said plane surface to cause successive drops to deposit in spaced locations.

7. Apparatus as defined in claim 4, wherein said means producing relative movement includes a rotatable cylinder providing said supporting means and arranged to carry said receiving member on at least a portion of its surface, said projecting means being mounted with respect to said cylinder such that said path extends along a chord intersecting the portion of the cylinder surface.

References Cited
UNITED STATES PATENTS
3,298,030    1/1967    Lewis et al. _____ 346—75
3,404,221    10/1968    Loughren _____ 178—5.2

FOREIGN PATENTS
714,216    7/1965    Canada _____ 346—75

JOSEPH W. HARTARY, Primary Examiner

U.S. Cl. X.R.

346—75